United States Patent [19]
Shimoda et al.

[11] 3,722,893
[45] Mar. 27, 1973

[54] PICKUP OF DISK REPRODUCER

[75] Inventors: Seisuke Shimoda; Yoshiaki Shimoda, both of Tokyo, Japan

[73] Assignee: Toho Machine Co., Ltd., Tokyo, Japan

[22] Filed: Apr. 17, 1970

[21] Appl. No.: 29,493

[52] U.S. Cl. ....................274/23 R
[51] Int. Cl. ....................G11b 3/10
[58] Field of Search ....................274/23 R

[56] References Cited

UNITED STATES PATENTS 3,494,623 2/1970 Nestle ....................274/23

*Primary Examiner*—Leonard Forman
*Assistant Examiner*—Charles E. Phillips
*Attorney*—Colton & Stone

[57] ABSTRACT

A pickup for disk transducing mechanisms is disclosed including a stylus force applying means for varying the contact force between the stylus and the recording disk. Another feature of the invention resides in the provision of a mechanism to rotate the pickup arm in opposition to the force produced by the stylus tracking in the spiral groove of the recording disk. Another feature of the invention is the provision of means for simultaneously adjusting the contact force and the tendency of the pickup arm to rotate toward the axis of rotation of the disk.

4 Claims, 9 Drawing Figures

INVENTORS.
SEISUKE SHIMODA
YOSHIAKI SHIMODA

BY Colton & Stone
ATTORNEYS.

Patented March 27, 1973 3,722,893

5 Sheets-Sheet 2

INVENTORS.
SEISUKE SHIMODA
YOSHIAKI SHIMODA

BY Colton & Stone

ATTORNEYS.

Patented March 27, 1973 3,722,893

5 Sheets-Sheet 3

INVENTORS.
SEISUKE SHIMODA
YOSHIAKI SHIMODA

BY Colton & Stone

ATTORNEYS.

Patented March 27, 1973 3,722,893

5 Sheets-Sheet 4

INVENTORS.
SEISUKE SHIMODA
YOSHIAKI SHIMODA

BY Colton + Stone

ATTORNEYS.

Patented March 27, 1973 3,722,893

5 Sheets-Sheet 5

INVENTORS.
SEISUKE SHIMODA
YOSHIAKI SHIMODA

BY Colton & Stone

ATTORNEYS

PICKUP OF DISK REPRODUCER

BACKGROUND OF THE INVENTION

This invention relates generally to disk transducing mechanisms, for example, phonographs, dictating equipment of the disk type and the like. As is well known in the art, an important operating parameter of disk transducing equipment is the contact force between the stylus and the disk. An excessive contact force wears the stylus and the disk too rapidly while an inadequate contact force tends toward poor reproduction of signals encoded on the disk.

Because of the spiral groove inherent on recording disks and the contact force between the stylus and the disk, there is generated a force on the pickup arm tending to rotate the same toward the axis of rotation of the recording disk. All other factors being constant, the magnitude of the force tending to rotate the pickup arm toward the disk is directly proportional to the contact force between the stylus and the disk. It is apparent that any adjustment of the contact forces must be compensated to avoid excessive wear of the stylus and of the disk. For purposes of convenience, the force tending to rotate the pickup arm toward the axis of rotation of the recording disk is referred to as the inside force.

The prior art has provided mechanisms for counteracting the inside force. The prior art has also provided means for adjusting the contact force and for separately adjusting the counteracting mechanism. These approaches have proved troublesome for several reasons. Among the difficulties faced by the prior art devices is that considerable skill and some specialized equipment is necessary to perform the separate adjustments in a satisfactory manner. Consequently, the general public has been unable to successfully perform these adjustments in a routine manner. Another disadvantage of the prior art devices is that the adjustment of the contact force cannot be accomplished while listening to the recording.

SUMMARY OF THE INVENTION

This invention provides a pickup including means for adjusting the attitude of the pickup arm about a horizontal axis thereof comprising a swing member, underlying the tone arm, pivotably mounted about a generally horizontal axis and engaging the tone arm on one side of the horizontal tone arm axis; means mounting the swing member for rotation about a vertical axis; a vertically reciprocable element engaging the swing member for pivoting the swing member about its axis and means for elevating the reciprocable element.

The invention also provides means for applying a first force to a tone arm to pivot the same about a horizontal axis thereof for applying contact force between a stylus and a recording element including first adjustment means for adjusting the first force; means for applying a second force to the tone arm to pivot the same about a vertical axis thereof in opposition to the force produced by the stylus tracking in the groove of a recording disk including second adjustment means for adjusting the second force and a single operator manipulable element operatively connected to the first and second adjustment means for simultaneously increasing the first and second forces upon one movement of the manipulable element and for simultaneously decreasing the first and second forces upon a second movement of the manipulable element.

It is accordingly an object of the invention to provide a pickup mechanism for disk transducers in which the contact force between the stylus and the disk is readily adjustable.

Another object of the invention is to provide a recording disk transducer having a contact force adjustment mechanism, an inside force counteracting mechanism and means for simultaneously adjusting the contact force and the inside force counteracting means.

BRIEF DESCRIPTION OF THE DRAWINGS

FIG. 8A is a diagram illustrating a curve substantially equivalent to the moment curve of the inside force; and FIG. 8B is a diagram illustrating the geometry of the inside force.

DETAILED DESCRIPTION OF THE EMBODIMENT

Figure 4:
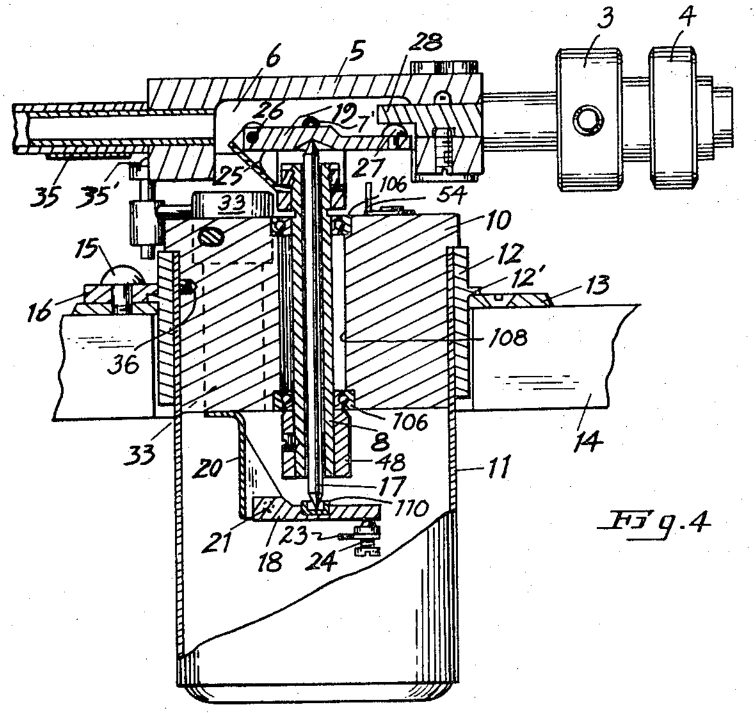
FIG. 4 is a cross sectional view of the device of FIG. 1 taken substantially along line I — I of FIG. 1 as viewed in the direction indicated by the arrows.
Figure 6:
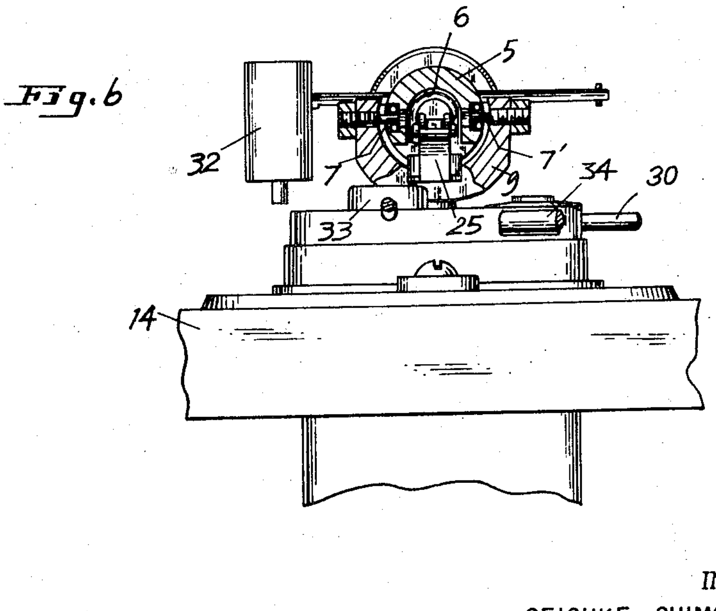
FIG. 6 is an end elevational view of the device of FIG. 1 as viewed from the pickup head side thereof, the tone arm being broken away along the line III — III thereof as viewed in the direction indicated by the arrows.

The pickup 100 of the invention is used in conjunction with a typical recording disk 102 having a spiral groove therein encoded in a typical fashion. The recording disk 102 is mounted on a suitable turntable (not shown) for rotation about an axis 0 in a typical manner. The pickup 100 comprises a pickup or tone arm 1 having a shell 2 on one end thereof containing a cartridge (not shown) from which extends a stylus 104 having a point P. A suitable counterweight comprised of a main weight 3 and a vernier weight 4 is provided on the opposite end of the tone arm 1 for substantially counterbalancing the same. The tone arm 1 is comprised of two parts connected by a coupling 5 having a downwardly opening recess 6 therein as shown in FIGS. 4 and 6.

The coupling 5 is mounted for rotation abut a horizontal axis by a pair of pivot connections 7, 7' carried by the legs of a U-shaped bracket 9 mounted on a vertical tubular spindle 8. The spindle 8 is rotatably mounted about an axis Q in a pair of bearings 106 positioned in a passage 108 extending through a base 10 of the pickup 100. As shown in FIG. 4, the axis of rotation of the spindle 8 intersects the axis defined by the pivots 7, 7' to provide means mounting the tone arm 1 for rotation about intersecting horizontal and vertical axes.

A case 11 encircles the major portion of the base 10 and is secured thereto by a sleeve 12 and a plurality of screw fasteners 36. The sleeve 12 includes a flange 12' fitting in a washer 13 secured to a frame 14. A fastener 15 and a shim 16 secure the sleeve 12 to the frame 14.

A vertically reciprocable element or rod 17 is positioned in the passage extending through the tubular spindle 8. The lower end of the rod 17 is pointed and is positioned in a fitting 110 carried by a lower swing member or plate 18 while the upper pointed end of the rod 17 defines a pivot connection with the lower surface of an upper swing plate 19.

A bracket 20 comprises part of the base 10 and mounts the swing plate 18 through pivot connections 21. The free end of the swing plate 18 is supported by an adjusting screw 24 slidably engaging the underside of the swing plate 18. The adjusting screw 24 is carried by one end of a leaf spring 23 which is secured at the other end thereof to the lower end of a vertical rotatable shaft 22 extending through a vertical passage 112 in the base 10. FIG. 4 illustrates the uppermost position of the swing plate 18 and the reciprocable rod 17. Upon rotation of the shaft 22, the leaf spring 23 and the adjusting screw 24 move to the left allowing the swing plate 18 to pivot downwardly by gravity. Subsequent rotation of the shaft 22 moves the screw 24 to the right elevates the swing plate 18 and the rod 17.

A bracket 25 is mounted on the upper end of the spindle 8 for rotation therewith and mounts the upper swing plate 19 by a horizontal pivot connection 26 spaced between the horizontal tone arm axis and the stylus 104. A contact element 27 is secured to the free end of the second swing plate 19 and engages a member 28 projecting from the rear of the coupling 5. It will be seen that the contact 27 engages the tone arm 1 spaced from the horizontal tone arm axis such that elevation of the reciprocable rod 17 acts to adjust the attitude of the tone arm 1 about the horizontal axis thereof. It is accordingly apparent that FIG. 4 represents the position of the rod 17 which exerts maximum contact force between the stylus 104 and the disk 102. It will accordingly be seen that there is provided means for applying a force to the tone arm 1 to pivot the same about the horizontal axis thereof for applying contact force between the stylus 104 and the recording disk 102.

Figure 1:
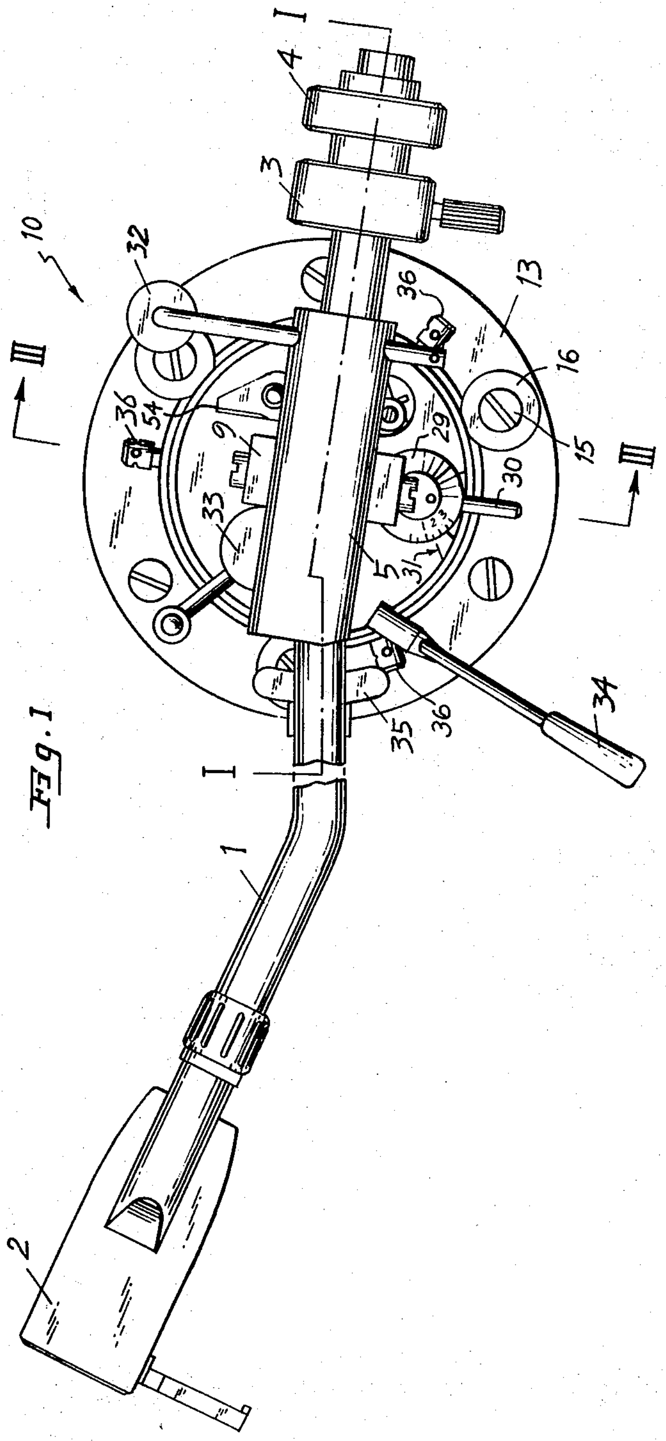
FIG. 1 is a plan view of one embodiment of this invention.

Secured to the upper end of the rotatable rod 22 is a cap 29 having a handle 30 thereon to provide for convenient rotation of the rod 22. A dial 31 (FIG. 1) is provided on the cap 29 to provide for convenient regulation of the contact force. It will accordingly be seen that the pickup 100 embodies means for adjusting the contact force.

An important feature of recording disk transducers is the provision of means for counteracting the inside force produced by the stylus tracking in the spiral groove. To this end there is provided a horizontal rotatable shaft 37 disposed in a passage 10' (FIGS. 2 and 7) in the base 10. On one end of the shaft 37 is affixed a cam follower 38 cooperating with a cam face 39 provided on the cap 29. It will be seen that elevation or depression of the end of the cam follower 38 will result in rotation of the shaft 37.

Figure 2:
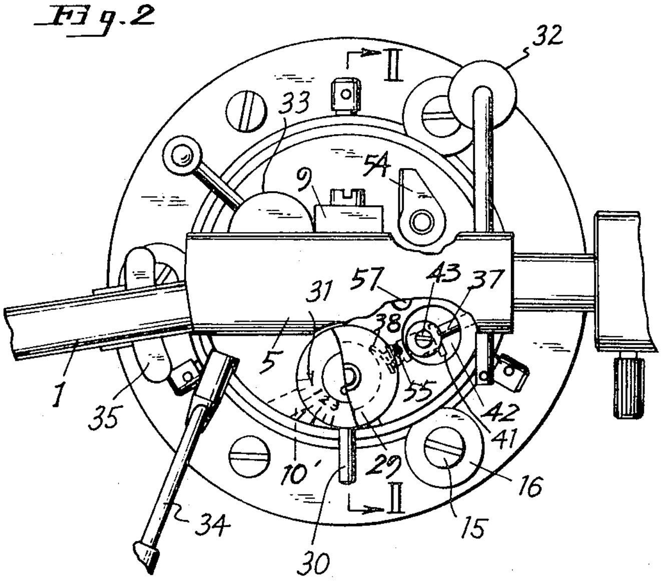
FIG. 2 is a partial plan view, similar to FIG. 1, certain parts being broken away.
Figure 5:
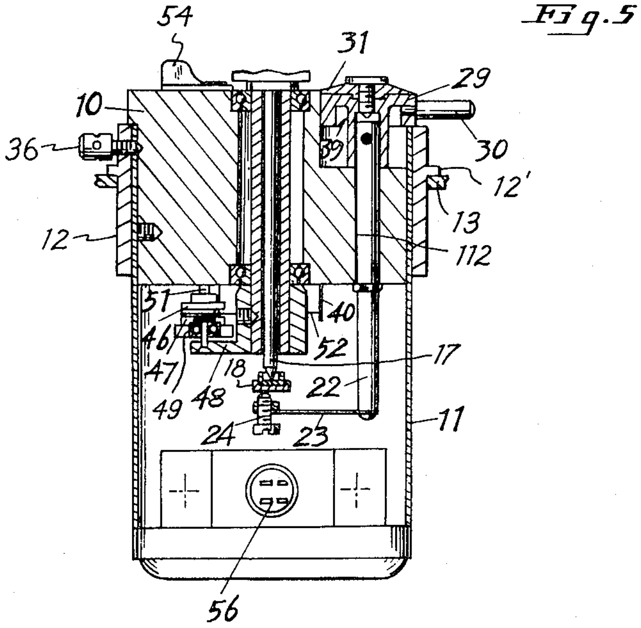
FIG. 5 is a cross sectional view of the device of FIG. 2 taken substantially along the line II — II of FIG. 2 as viewed in the direction indicated by the arrows.

One end of a stiff thin resilient wire 40, e.g. piano wire, is affixed to a swing piece 41 which is rotatably mounted on the other end of the shaft 37. The position of the swing piece 41 and consequently the tension in the wire 40 may be adjusted by an adjustable screw 43 threaded into the large diameter portion of the shaft 37. The screw 43 engages a washer 44 which is in turn in engagement with the top of the inclined side 45 of the swing piece 41. Upon rotation of the shaft 37 in the direction of the dashed arrow, the washer 44 contacts the swing piece 41 to move the wire 40 into the dashed position of FIG. 7. As shown in FIG. 2, the adjusting screw 43 and wire 40 extend through a bore 42 in the base 10.

Figure 7:
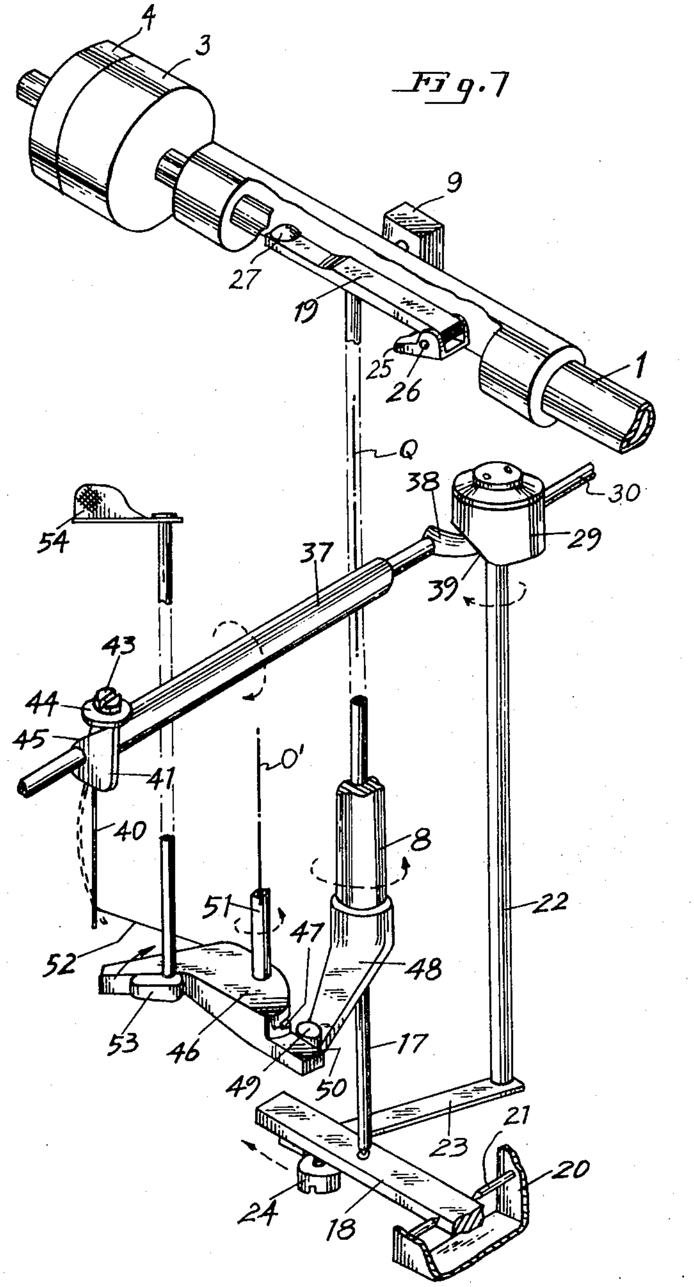
FIG. 7 is a perspective view of the contact force applying mechanism, the inside force counteracting mechanism and the adjusting mechanism therefor.

As shown in FIG. 7, a thread or yarn 52 is secured to the opposite end of the wire 40 and extends in a groove 47 provided on a cam 46. The cam 46 is mounted by a shaft 51 for rotation and comprises a cam face 50. The cam face 50 is in engagement with a roller 49 provided on the end of a crank arm 48 affixed to the spindle 8. It will be seen that rotation of the shaft 37 in the direction of the dashed arrow in FIG. 7 bows the wire 40 and further tensions the yarn 52 to rotate the cam 46 about the axis of the shaft 51. The roller 49 is consequently contacted by the cam face 50 to rotate the spindle 8 in the direction shown by the dashed arrow. Since the spindle 8 comprises the vertical tone arm axis mounting means, it will be seen that there is provided means for applying a force to the tone arm 1 to pivot the same about the vertical axis Q in opposition to the inside force.

There is also provided means for disengaging the cam follower 49 from the cam 46 comprising a rotatable cam 53 having an operator 54. Rotation of the operator 54 biases the cam 46 in the direction shown by the solid arrow in FIG. 7 to disengage the cam face 50 from the roller 49.

It will be seen that the stylus force applying mechanism and the inside force compensating mechanism of the pickup 100 are simultaneously adjustable by rotation of the handle 30. Rotating the handle 30 in the direction of the arrow in FIG. 7 moves the adjusting screw 24 to elevate the plate 18 and rod 17 to increase the contact force between disk 102 and stylus 104. Since the cam face 39 is simultaneously rotated upon rotation of the handle 30, the shaft 37 is rotated to further tension the yarn 52 thereby rotating spindle 8 in the direction of the arrow in FIG. 7. It will accordingly be seen that the element 30 constitutes a single manipulable element for an operator to simultaneously adjust the contact force and the inside force compensating mechanism. The shape of the cam face 50 is designed to increase the force applied to the spindle 8 as the contact force increases.

Figures 3, 8:
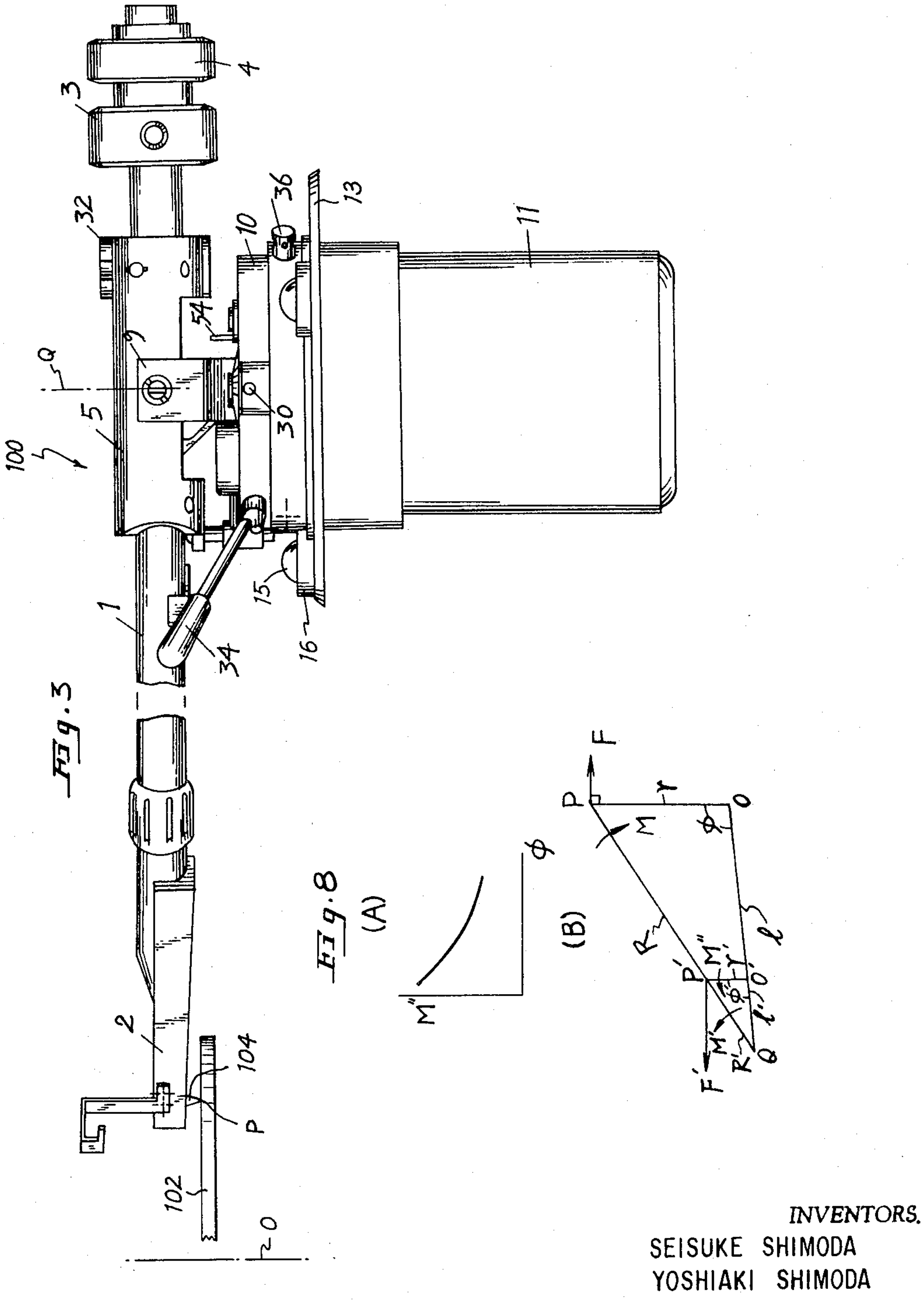
FIG. 3 is a side elevational view of the device of FIGS. 1 and 2.

There is shown in FIG. 8A a graph representing the moment M'' that must be produced by the inside force compensating mechanism as a function of $\phi$. As shown in FIG. 8B, $\phi$ is the angle between the vertical axis Q of the tone arm 1, the axis O of the turntable (not shown) and the stylus point P. The distance between the vertical axis Q and the turntable axis O is represented by $l$. The distance between the turntable axis O and the stylus point P is represented by $r$. R represents the distance between the vertical axis Q and the stylus point P.

Comparing FIGS. 7 and 8B, the distance between the vertical axis Q and the axis O' of the shaft 51 is represented by $l'$. The distance between the axis O' and the contact between the roller 49 and cam face 50 is represented by $r'$. The length of the element 48 is represented by R'. P' represents the contact between the cam face 50 and the follower 49. The angle between the vertical axis Q, shaft axis O' and contact point P' is designated $\phi'$. The shaft axis O' preferably resides in a plane defined by the vertical axis Q and the turntable axis O while the contact point P' preferably resides in a plane defined by the stylus point P and the vertical axis Q. The angles $\phi$, $\phi'$ are consequently of the same value for all positions of the tone arm 1.

The inside moment produced by tracking of the stylus 104 in the groove of disk 102 is represented by M while the inverse moment that must be applied to the tone arm 1 to balance the inside moment M is designated M'. M'' is the moment applied by the inside force compensating means to the spindle 8 to produce the inverse moment M'. F is the force produced on the stylus 104 by tracking in the groove.

It will be apparent to those skilled in the art that $M'' = r'F' = rF = F\,(l \cos\phi \pm \sqrt{l^2 \cos^2\phi - l^2 + R^2}\,)$. From this curve, the shape of the cam face 50 may be accomplished in a conventional manner.

We claim.

1. In a pickup for reproducing signals from a spiral groove on a rotatable recording disk, the combination comprising:
   a base for rigid attachment to a frame;
   a substantially counterbalanced tone arm having thereon means to receive a stylus for tracking in the groove and transducing signals therefrom;
   means rotatably mounting the tone arm on the base for movement about horizontal and vertical axes;
   means for applying a force to the tone arm to pivot the same about the horizontal axis thereof for applying contact force between the stylus and recording disk, the force applying means including rigid first adjustment means operative along a path coincident with the vertical axis for adjusting the force;
   means for applying a moment to the tone arm to pivot the same about the vertical axis thereof in opposition to the force produced by the stylus tracking in the groove in the recording disk, the moment applying means including rigid second adjustment means operative about the vertical axis for adjusting the moment; and
   a single operator manipulable element, means movably supporting the element on the base independently of the tone arm and the tone arm mounting means, and means, operative through the base, connecting the element to the first and second adjustment means for simultaneously increasing the force and moment upon one movement of the manipulable element and for simultaneously decreasing the force and moment upon a second different movement of the manipulable element.

2. The combination of claim 1 wherein the force applying means comprises a swing member underlying the tone arm and engaging the same on one side of the horizontal tone arm axis;
   means mounting the swing member for movement with the tone arm about the vertical tone arm axis and mounting the swing member for pivotal movement about a horizontal axis; a vertically reciprocable element engaging the swing member for pivoting the same about its horizontal axis; and
   the first adjustment means comprises means for elevating the reciprocable element.

3. The combination of claim 2 wherein
   the means mounting the tone arm for movement about the vertical axis comprises
   a base having a vertical passage therethrough; and
   a spindle mounted in the base passage for rotation about the vertical tone arm axis, the spindle having a passage therethrough receiving the reciprocable element, the swing member being carried by the spindle, the spindle comprising the swing member mounting means;
   the horizontal tone arm axis mounting means being carried by the spindle; and
   the moment applying means comprising means for rotatably positioning the spindle.

4. The combination of claim 3 wherein the moment applying means comprises:
   an arm connected to the spindle for rotating the same;
   a cam engagable with the arm for moving the same; and
   means connecting the manipulable element and the cam for adjusting the position of the cam and the arm upon movement of the manipulable element.

* * * * *